US012358108B1

(12) United States Patent
Andrews et al.

(10) Patent No.: US 12,358,108 B1
(45) Date of Patent: Jul. 15, 2025

(54) CLEVIS PIN PRESS TOOL

(71) Applicant: Tiger Tool International Incorporated, Abbotsford (CA)

(72) Inventors: Michael Andrews, Bellingham, WA (US); Adam Baran, Vancouver (CA)

(73) Assignee: Tiger Tool International Incorporated, Abbotsford (CA)

( * ) Notice: Subject to any disclaimer, the term of this patent is extended or adjusted under 35 U.S.C. 154(b) by 0 days.

(21) Appl. No.: 18/645,304

(22) Filed: Apr. 24, 2024

Related U.S. Application Data

(60) Provisional application No. 63/620,121, filed on Jan. 11, 2024.

(51) Int. Cl.
*B25B 27/02* (2006.01)
*B25B 27/00* (2006.01)

(52) U.S. Cl.
CPC ........ *B25B 27/023* (2013.01); *B25B 27/0035* (2013.01)

(58) Field of Classification Search
CPC .......................... B25B 27/023; B25B 27/0035
See application file for complete search history.

(56) References Cited

U.S. PATENT DOCUMENTS

| | | | |
|---|---|---|---|
| 569,527 | A | 10/1896 | Tilton |
| 689,154 | A | 12/1901 | Bartlett |
| 1,131,868 | A | 3/1915 | Ridlon |
| 1,155,720 | A | 10/1915 | Louis |
| 1,334,658 | A | 3/1920 | Koch |
| 1,368,760 | A | 2/1921 | Schilling |
| 1,429,567 | A | 9/1922 | Carlisle |
| 1,442,626 | A | 1/1923 | McGee |
| 1,476,983 | A | 12/1923 | King |
| 1,498,638 | A | 6/1924 | Periolat |
| 1,552,616 | A | 9/1925 | Jake |
| 1,650,964 | A | 11/1927 | Schmitt |
| 1,682,956 | A | 9/1928 | Dawson et al. |
| 1,778,802 | A | 10/1930 | Howell |

(Continued)

FOREIGN PATENT DOCUMENTS

| | | | |
|---|---|---|---|
| AU | 2015200375 | A1 | 8/2015 |
| AU | 2015200630 | A1 | 8/2015 |

(Continued)

OTHER PUBLICATIONS

Amazon.com, [Anti-Spill Cup Holder], date first available May 18, 2020 [online], [site visited May 19, 2023], available from the internet URL; https://amazon.com/Anti-Spill-Holder-Coaster-Anti-Slip-Outdoors/dp/B08L8MWXJY (Year: 2020).

(Continued)

*Primary Examiner* — Jason L Vaughan
*Assistant Examiner* — Amanda Kreiling
(74) *Attorney, Agent, or Firm* — Michael R. Schacht; Schacht Law Office, Inc.

(57) ABSTRACT

A press tool comprises a base assembly defining a housing guide surface, a drive pin, and a guide sleeve defining a sleeve guide surface. The drive pin engages the base assembly such that axial rotation of the drive pin causes linear displacement of the drive pin relative to the base assembly. The housing guide surface engages the guide sleeve. The sleeve guide surface engages the drive pin.

19 Claims, 10 Drawing Sheets

(56) References Cited

U.S. PATENT DOCUMENTS

| | | | |
|---|---|---|---|
| 1,817,988 A | 8/1931 | Emal | |
| 1,849,805 A | 3/1932 | Raymond | |
| 1,857,211 A | 5/1932 | Odlum et al. | |
| 1,990,570 A | 2/1935 | Smith | |
| 1,996,967 A | 4/1935 | Kratky | |
| 2,036,782 A | 4/1936 | Ulmo | |
| 2,052,534 A | 8/1936 | Quarles | |
| 2,085,529 A | 6/1937 | Heimback et al. | |
| 2,290,427 A | 7/1942 | Harrington | |
| 2,366,467 A | 1/1945 | Anderson | |
| 2,374,861 A | 5/1945 | Graham | |
| 2,380,980 A | 8/1945 | Looney | |
| 2,427,948 A | 9/1947 | Cornwell | |
| 2,484,129 A | 10/1949 | Taylor | |
| 2,549,429 A | 4/1951 | Cowles | |
| 2,681,501 A | 6/1954 | Albert | |
| 2,755,540 A | 7/1956 | Crozier | |
| 2,798,392 A | 7/1957 | Randolph | |
| 3,102,333 A | 9/1963 | Thornton et al. | |
| 3,110,958 A | 11/1963 | McCord | |
| 3,123,901 A | 3/1964 | Traught | |
| 3,200,483 A | 8/1965 | Menegoni | |
| 3,237,291 A | 3/1966 | Kelso | |
| 3,327,377 A | 6/1967 | German | |
| 3,336,652 A | 8/1967 | Andre | |
| 3,662,449 A | 5/1972 | Hashimoto | |
| 3,742,570 A | 7/1973 | Felser | |
| 3,785,050 A | 1/1974 | Whitledge et al. | |
| 3,862,483 A | 1/1975 | Kloster | |
| 3,964,149 A | 6/1976 | Hugh | |
| 4,034,458 A | 7/1977 | Ford et al. | |
| 4,195,398 A | 4/1980 | Matthews | |
| 4,363,475 A | 12/1982 | McCarty | |
| 4,398,706 A | 8/1983 | Kaulfuss | |
| 4,426,758 A | 1/1984 | Castoe | |
| 4,428,105 A | 1/1984 | Abbott et al. | |
| 4,476,750 A | 10/1984 | Murphy | |
| 4,589,180 A | 5/1986 | Vachon | |
| 4,619,027 A | 10/1986 | Ohannesian | |
| 4,624,039 A | 11/1986 | Lawrence et al. | |
| 4,648,166 A | 3/1987 | Tilman | |
| 4,649,615 A | 3/1987 | Hundley | |
| 4,672,731 A | 6/1987 | Taylor | |
| 4,691,424 A | 9/1987 | Michael et al. | |
| 4,765,057 A | 8/1988 | Muller | |
| 4,769,890 A | 9/1988 | Maynard | |
| 4,770,401 A | 9/1988 | Donaldson | |
| 4,771,528 A | 9/1988 | Stromberg | |
| 4,867,366 A | 9/1989 | Kleinholz | |
| 4,940,370 A | 7/1990 | Gipson | |
| 4,941,252 A | 7/1990 | Haisch et al. | |
| 4,976,280 A | 12/1990 | Lagana | |
| 4,977,660 A | 12/1990 | Maynard | |
| 4,989,312 A | 2/1991 | Maddalena | |
| 5,025,542 A | 6/1991 | Jacks | |
| 5,125,324 A | 6/1992 | Araki et al. | |
| 5,159,743 A | 11/1992 | Somerville | |
| 5,163,665 A | 11/1992 | Klearman | |
| 5,174,005 A | 12/1992 | Somerville | |
| 5,181,303 A | 1/1993 | Gregg | |
| 5,210,919 A | 5/1993 | Garman | |
| 5,211,211 A | 5/1993 | Rubino et al. | |
| 5,224,254 A | 7/1993 | McPeak et al. | |
| 5,233,741 A | 8/1993 | Maynard | |
| 5,255,435 A | 10/1993 | Shultz | |
| 5,257,445 A | 11/1993 | Mayberry | |
| 5,271,136 A | 12/1993 | Skoworodko | |
| 5,341,553 A | 8/1994 | Herzhauser | |
| 5,350,183 A | 9/1994 | Shealy | |
| 5,355,574 A | 10/1994 | Zweekly et al. | |
| 5,373,636 A | 12/1994 | Martinie | |
| 5,419,027 A | 5/1995 | McPeak et al. | |
| 5,519,929 A | 5/1996 | Bleckman | |
| 5,535,973 A | 7/1996 | Bailey et al. | |
| 5,557,833 A | 9/1996 | Pool | |
| 5,586,378 A | 12/1996 | Smith | |
| 5,606,788 A | 3/1997 | Rubino et al. | |
| 5,692,437 A | 12/1997 | Tabain | |
| 5,787,561 A | 8/1998 | Harmand | |
| 5,839,180 A | 11/1998 | Hochmiller | |
| RE36,009 E | 12/1998 | Shultz | |
| 5,857,252 A * | 1/1999 | Jansen | B25B 27/062 29/257 |
| 5,887,328 A | 3/1999 | Rydin et al. | |
| 5,893,202 A | 4/1999 | Graham et al. | |
| 5,898,985 A | 5/1999 | Villarreal | |
| 5,983,474 A | 11/1999 | Koppe | |
| 6,092,279 A | 7/2000 | Shoup | |
| 6,158,110 A | 12/2000 | Takacs | |
| 6,192,566 B1 | 2/2001 | Dunum | |
| 6,431,534 B1 | 8/2002 | Orosz et al. | |
| 6,505,390 B2 | 1/2003 | Emanuel | |
| 6,574,843 B1 | 6/2003 | Meadows | |
| 6,601,277 B1 | 8/2003 | Swanson | |
| 6,618,920 B1 | 9/2003 | Emanuel | |
| 6,716,218 B2 | 4/2004 | Holmes et al. | |
| 6,789,791 B2 | 9/2004 | Genduso | |
| 7,003,877 B2 | 2/2006 | Reale | |
| 7,020,944 B2 | 4/2006 | Klann | |
| 7,093,809 B2 | 8/2006 | Hwang | |
| 7,117,573 B1 | 10/2006 | Hu | |
| 7,213,317 B2 | 5/2007 | Hu | |
| 7,219,885 B2 | 5/2007 | Nardozza | |
| 7,387,296 B2 | 6/2008 | Alberti | |
| 7,475,465 B1 | 1/2009 | Weiss | |
| 7,520,041 B1 | 4/2009 | Aguilar | |
| 7,669,305 B1 | 3/2010 | Lionberg | |
| 7,669,306 B2 | 3/2010 | Palka | |
| 7,685,688 B2 | 3/2010 | Fan | |
| 7,707,709 B2 | 5/2010 | Whitehead | |
| 7,717,573 B2 | 5/2010 | Matsubara et al. | |
| 7,818,860 B2 | 10/2010 | Hume et al. | |
| 7,890,305 B2 | 2/2011 | Lionberg | |
| 7,891,084 B1 | 2/2011 | Sollami | |
| 7,895,723 B2 | 3/2011 | Wridt et al. | |
| 7,918,003 B2 | 4/2011 | Acciardo, Jr. | |
| 7,996,972 B2 | 8/2011 | Hu | |
| 8,079,123 B2 | 12/2011 | Lin | |
| 8,205,529 B1 | 6/2012 | Laurie | |
| 8,256,081 B2 | 9/2012 | Fridman | |
| 8,387,252 B1 | 3/2013 | Johnson et al. | |
| 8,567,292 B1 | 10/2013 | Park et al. | |
| 8,627,557 B2 | 1/2014 | Jansen et al. | |
| 8,689,420 B2 | 4/2014 | Barrios et al. | |
| 8,745,832 B2 | 6/2014 | Barrios et al. | |
| 9,107,719 B2 | 8/2015 | Gauthier | |
| 9,511,488 B2 | 12/2016 | Andrews et al. | |
| 9,651,093 B2 | 5/2017 | Robb, Jr. | |
| 9,701,179 B2 | 7/2017 | Bernardo | |
| 9,718,177 B1 | 8/2017 | Bell | |
| 9,751,199 B2 | 9/2017 | Andrews et al. | |
| 9,808,922 B2 | 11/2017 | Breschi et al. | |
| 9,908,208 B2 | 3/2018 | Andrews et al. | |
| 9,981,368 B2 | 5/2018 | Zeren et al. | |
| 10,005,175 B2 | 6/2018 | Morris | |
| 10,179,397 B1 | 1/2019 | Hunter | |
| 10,265,839 B1 | 4/2019 | Hunter | |
| 10,307,901 B2 | 6/2019 | Andrews et al. | |
| 10,486,293 B2 | 11/2019 | Verkley | |
| 10,583,546 B2 | 3/2020 | Yang | |
| 10,668,604 B2 | 6/2020 | Caywood et al. | |
| 10,744,627 B2 | 8/2020 | Andrews | |
| 10,906,140 B2 | 2/2021 | Andrews et al. | |
| 10,987,788 B2 | 4/2021 | Andrews | |
| 11,090,788 B2 | 8/2021 | Huang | |
| 11,135,711 B2 | 10/2021 | Andrews | |
| 11,285,583 B2 | 3/2022 | Stuart et al. | |
| 11,370,093 B2 * | 6/2022 | Kochie | B25B 5/163 |
| 11,815,132 B2 | 11/2023 | Andrews | |
| 11,926,025 B2 | 3/2024 | Andrews | |
| 11,999,034 B2 | 6/2024 | Andrews | |
| 12,138,759 B2 | 11/2024 | Andrews | |
| 2001/0029655 A1 | 10/2001 | Emanuel | |
| 2002/0095759 A1 | 7/2002 | Scott | |

(56) References Cited

U.S. PATENT DOCUMENTS

2003/0033909 A1 2/2003 Gore
2003/0084555 A1 5/2003 Meggiolan
2003/0106197 A1 6/2003 Emanuel
2005/0071973 A1 4/2005 Emanuel
2006/0037184 A1 2/2006 Miller
2006/0070221 A1 4/2006 Wridt et al.
2006/0075617 A1 4/2006 Toosky et al.
2006/0112530 A1 6/2006 Rubino et al.
2006/0162509 A1 7/2006 Wang
2007/0251076 A1 11/2007 Zhong et al.
2008/0048375 A1 2/2008 Rolfe et al.
2008/0235930 A1 10/2008 English
2008/0289841 A1 11/2008 Kang
2009/0025514 A1 1/2009 Barrios et al.
2009/0211094 A1 8/2009 Adelman
2010/0000749 A1 1/2010 Andel
2010/0015834 A1 1/2010 Siebens
2010/0236039 A1 9/2010 Robledo
2010/0251528 A1 10/2010 Hu
2010/0281665 A1 11/2010 Punaro
2010/0283193 A1 11/2010 Huang
2011/0048649 A1 3/2011 Komatsu et al.
2011/0094076 A1 4/2011 Liu
2011/0219617 A1 9/2011 Barrios et al.
2012/0110815 A1 5/2012 Brown
2012/0272499 A1 11/2012 Schley et al.
2013/0026692 A1 1/2013 Prins
2013/0074306 A1 3/2013 Muenchrath et al.
2013/0133175 A1 5/2013 Doan et al.
2014/0338166 A1 11/2014 Studney
2014/0345104 A1 11/2014 Andrews et al.
2014/0366954 A1 12/2014 Miller et al.
2015/0183102 A1 7/2015 Breschi et al.
2015/0183268 A1 7/2015 Baldassara et al.
2015/0209918 A1 7/2015 Andrews
2015/0224635 A1* 8/2015 Andrews ............. B25B 27/0035
29/251
2015/0290785 A1 10/2015 Zimmer et al.
2017/0100825 A1 4/2017 Zeren et al.
2017/0209994 A1 7/2017 Hargrove et al.
2017/0297152 A1 10/2017 Andrews
2017/0307020 A1 10/2017 Andrews
2017/0361438 A1 12/2017 Andrews
2018/0207776 A1 7/2018 Andrews
2018/0363693 A1 12/2018 Yokomatsu
2018/0370002 A1 12/2018 Andrews
2019/0070716 A1 3/2019 Andrews
2020/0039041 A1 2/2020 Huang
2021/0285499 A1 9/2021 Andrews
2021/0387316 A1 12/2021 Andrews
2022/0063071 A1 3/2022 Andrews
2023/0138801 A1 5/2023 Andrews
2023/0142403 A1 5/2023 Andrews
2023/0228298 A1 7/2023 Andrews
2024/0084855 A1 3/2024 Andrews
2024/0227140 A1 7/2024 Andrews
2024/0227141 A1 7/2024 Klossok
2024/0316735 A1 9/2024 Andrews
2024/0342884 A1 10/2024 Andrews
2024/0376936 A1 11/2024 Andrews
2024/0416492 A1 12/2024 Andrews
2025/0060007 A1 2/2025 Andrews
2025/0065478 A1 2/2025 Andrews

FOREIGN PATENT DOCUMENTS

AU 2015334596 A1 5/2017
AU 2015335682 A1 5/2017
AU 2017225956 A1 8/2018
AU 2017248765 A1 9/2018
AU 2015200375 B2 7/2019
AU 2017248765 B2 11/2021
AU 2021234318 A1 10/2022
AU 2022201899 A1 10/2022
AU 2023205074 A1 7/2024
AU 2024202656 A1 11/2024
AU 202417089 12/2024
AU 202417562 12/2024
AU 202510470 2/2025
AU 202510473 2/2025
AU 2024205751 A1 3/2025
CA 234055 A 9/1923
CA 234525 A 9/1923
CA 236911 A 1/1924
CA 236912 A 1/1924
CA 236913 A 1/1924
CA 2037021 A1 8/1995
CA 2852069 A1 11/2014
CA 2880139 A1 7/2015
CA 2881390 A1 8/2015
CA 2890557 A1 10/2015
CA 2965264 A1 4/2016
CA 2965324 A1 4/2016
CA 3015834 A1 9/2017
CA 3015852 A1 10/2017
CA 2852069 C 1/2019
CA 2881390 C 4/2019
CA 3037021 A1 9/2019
CA 3015834 C 5/2021
CA 3176714 A1 9/2021
CA 3187064 A1 12/2021
CA 3128996 A1 2/2022
CN 106414122 A 2/2017
DE 1741595 3/1957
DE 19631524 C1 11/1997
DE 20113561 U1 11/2001
DE 10221280 C1 8/2003
DE 20311755 U 10/2003
DE 202006000788 U1 5/2006
EP 0988937 A2 3/2000
EP 2461061 A2 6/2012
EP 3423238 A1 1/2019
EP 3442751 A1 2/2019
EP 3678820 A 7/2020
EP 3678820 A1 7/2020
EP 4454817 A1 10/2024
EP 4537983 4/2025
FR 2387090 A1 11/1978
FR 2670703 A1 6/1992
JP 104800 9/1974
JP S49104800 U 10/1974
JP S57116178 A 7/1982
JP S62192877 U 8/1987
JP 192877 12/1987
JP H0192877 A 4/1989
JP H04105881 A 4/1992
JP H104800 A 1/1998
JP 3104800 10/2004
JP 4105881 B2 6/2008
JP 3160459 U 6/2010
JP 3192877 9/2014
KR 100746562 B1 8/2007
KR 101746033 B1 6/2017
MX 2022003342 A 9/2022
RU 2028933 C1 2/1995
SU 654401 A2 3/1979
SU 1207744 A1 1/1986
SU 1384368 A1 3/1988
SU 1505740 A1 9/1989
SU 1632766 A1 3/1991
TW 306377 U 5/1997
TW 471371 U 1/2002
TW M342918 U 10/2008
TW M497081 U 3/2015
WO 2011012552 A1 2/2011
WO 2016063140 A2 4/2016
WO 2016065311 A1 4/2016
WO 2016063140 A3 6/2016
WO 2017151953 A1 9/2017
WO 2017181078 A1 10/2017
WO 2019050989 A1 3/2019

(56) References Cited

FOREIGN PATENT DOCUMENTS

| | | | |
|---|---|---|---|
| WO | 2021183800 | A1 | 9/2021 |
| WO | 2021257477 | A1 | 12/2021 |
| WO | 2023133401 | A1 | 7/2023 |

OTHER PUBLICATIONS

Canadian Intellectual Property Office, "Office Action, Application No. 2,880,139,", Jan. 7, 2019, 3 pages.
European Registration Serial No. 001348411-0001; Beverage Holders; Inventor Thomas J. Shaw; Registered Oct. 23, 2012; Published Apr. 9, 2013; 3 pages.
Greenerd, "Arbor Press History," Website http://www.greenerd.com/about-greenerd/history/default.aspxp. 2, predates Mar. 13, 2020, 5 pages.
International Searching Authority, International Search Report and Written Opinion, PCT/IB2015/002481, May 10, 2016, 6 pages.
International Searching Authority, International Search Report, Apr. 25, 2023, 2 pages.
International Searching Authority, ISR & Written Opinion, PCT/CA2024/050014, Mar. 27, 2024, 10 pages.
International Searching Authority, ISR & Written Opinion, PCT/US2015/057201, Dec. 22, 2015, 9 pages.
International Searching Authority, ISR & Written Opinion, PCT/US2017/020496, Jun. 1, 2017, 7 pages.
International Searching Authority, ISR & Written Opinion, PCT/US2017/027724, Aug. 17, 2017, 7 pages.
International Searching Authority, ISR & Written Opinion, PCT/US2018/049608, Dec. 6, 2018, 8 pages.
International Searching Authority, ISR & Written Opinion, PCT/US2021/021963, Jun. 3, 2021, 7 pages.
International Searching Authority, ISR & Written Opinion, PCT/US2021/037271, Jun. 15, 2020, 6 pages.
International Searching Authority, Written Opinion of the International Searching Authority, Apr. 25, 2023, 7 pages.
OTC, "Wheel Stud Remover/Installer," Product Brochure, 2009, 1 page, Product No. 5195.
OTC, "Wheel Stud Service Kit," Product Brochure, 2012, 1 page, Product No. 4295.
Registration Serial No. 302647759; Country China; Feeding Bottle Protective Sleeve; Inventor-Du Yaodong; Granted Nov. 20, 2013; 3 pages.
Semenov V. M., "Non-standard tool for dismantling and assembly work", Moskva, Izdatelstvo Kolos, (19750000), pp. 200-201, 219, 220, 253, 254, 257.
Toyota, "4Runner Repair Manual, Inspection and Repair of Front Axle Hub" 1990, pp. 1 and SA-18, vol. 2Publication No. RM143U2.
Wikipedia, "Hydraulic Press," Website http://en.wikipedia.org/wiki/Hydraulic-pressp., predates Mar. 13, 2020, 1.

* cited by examiner

CLEVIS PIN PRESS TOOL

RELATED APPLICATIONS

This application, U.S. patent application Ser. No. 18/645,304 filed Apr. 24, 2024, claims benefit of U.S. Provisional Application Ser. No. 63/620,121 filed Jan. 11, 2024, the contents of which are incorporated here by reference.

TECHNICAL FIELD

This invention relates to a press, in particular a press to move a pin contained in a body. The invention finds particular application in the removal of a clevis pin from a clevis.

BACKGROUND

Pins are frequently used to secure two components together. In particular, a clevis pin may be used to secure a part to a clevis (or yoke). The clevis and rod end are formed with openings that can be aligned and the clevis pin inserted. The clevis pin has a head at one end and an opening through the other end. The pin is located by placing a split pin through the opening to secure the clevis pin in the clevis. This arrangement is widely used. The present invention is of particular significance when used to remove clevis pins of brake slack adjuster in trucks, buses, and other heavy vehicles. Accordingly, while the present invention will be described herein in the context of a clevis pin used as part of a brake slack adjuster, the present invention may be used in connection with clevis pins used for purposes in addition to or instead of a clevis pin for a brake slack adjuster.

Brake slack adjusters are used to control the adjustment of the air brakes. The rake slack adjuster comprises a housing. mounted on a shaft, with an arm extending from the housing. The brake slack adjuster is a means of taking up the slack caused by wear of the brakes and in the system. If no compensation is carried out for wear then the brakes become unsafe due to excessive travel. The additional movement necessary in the system can mean that components within the system do not align properly, which has an adverse effect on the operation of the brakes.

Like any component on a truck or heavy duty vehicle the brake slack adjusters must be serviced. They are subjected to heavy wear in adverse conditions. Corrosion is inevitable. This corrosion, in addition to reducing the efficiency of the system, also introduces problems in serving the system. These problems are compounded by the fact that the connections are frequently in inaccessible positions, making it difficult to get proper access to the components to allow their dismantling.

RELATED ART

U.S. Pat. No. 5,271,136 discloses press systems and methods that may be used to remove the clevis pin of a brake slack adjuster. Even minor misalignment of a threaded drive member forming part of the tool disclosed in the '136 patent relative to the axis of the clevis pin can result in failure of that tool to effectively remove the clevis pin.

SUMMARY

The present invention may be embodied as a press tool comprising a base assembly defining a housing guide surface, a drive pin, and a guide sleeve defining a sleeve guide surface. The drive pin engages the base assembly such that axial rotation of the drive pin causes linear displacement of the drive pin relative to the base assembly. The housing guide surface engages the guide sleeve. The sleeve guide surface engages the drive pin.

The present invention may also be embodied as a method of pressing a clevis pin comprising the following steps. A base assembly defining a housing guide surface is provided. A drive pin is provided. A guide sleeve defining a sleeve guide surface is provided. The drive pin is arranged to engage the base assembly such that axial rotation of the drive pin causes linear displacement of the drive pin relative to the base assembly. The guide sleeve is arranged relative to the base assembly such that the housing guide surface engages the guide sleeve. The guide sleeve is arranged relative to the base assembly such that the sleeve guide surface engages the drive pin.

DETAILED DESCRIPTION

Figure 1:
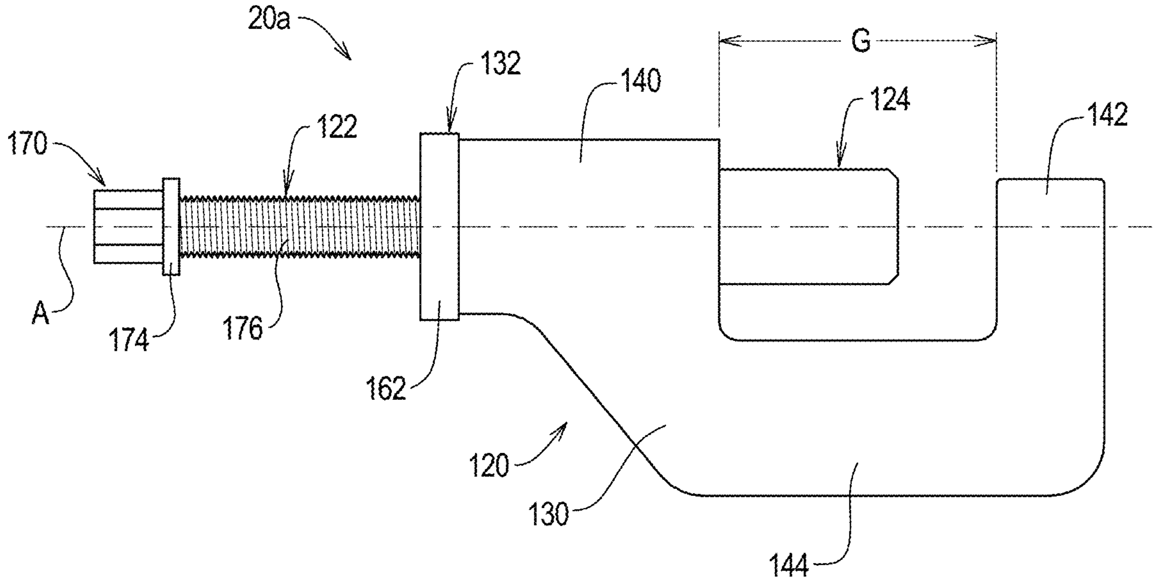
FIG. 1 is a side elevation view of a first example press tool of the present invention.
Figure 2:
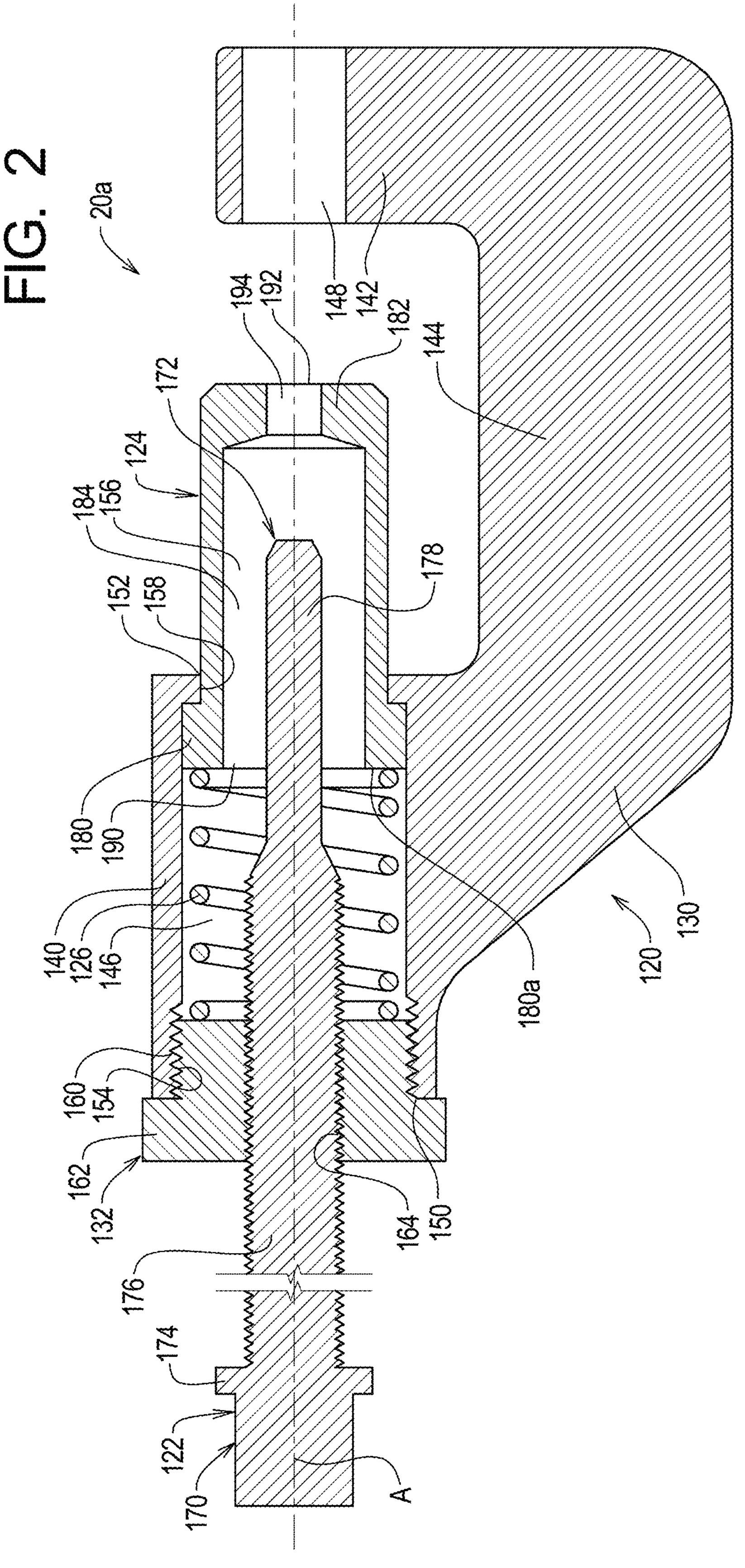
FIG. 2 is a longitudinal side section view of the first example press tool in a fully extended configuration.
Figure 3:
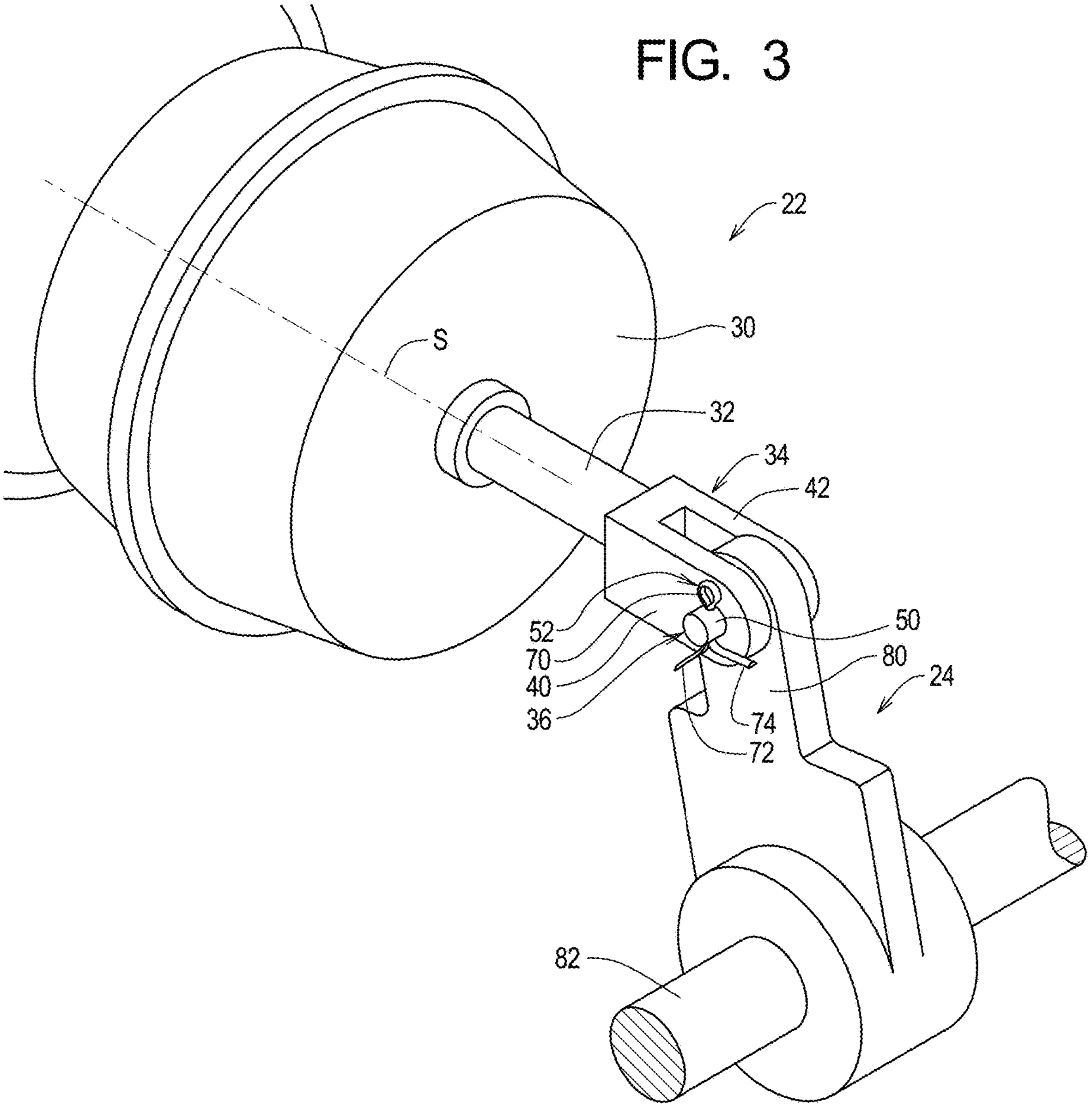
FIG. 3 is a perspective view illustrating an example braking system comprising a clevis and clevis pin assembly.

The present invention may be embodied in different forms, and several example embodiments of the present invention will be described below.

I. First Example Embodiment

Referring now to FIGS. 1-8 of the drawing, depicted therein is a first example press tool 20*a* constructed in accordance with, and embodying, the principles of the present invention. The example press tool 20*a* is configured for use with a braking system 22 having a brake slack adjuster 24. The braking system 22 and brake slack adjuster 24 are or may be conventional and will be described herein only to that extent helpful to a complete understanding of the construction and operation of the first example press tool 20*a*.

The example braking system 22 comprises an air pot 30, push rod 32, clevis (or yoke) 34, and a clevis pin assembly 36. The example clevis 34 defines a first clevis arm 40 and a second clevis arm 42. The first and second clevis arms 40 and 42 define first and second clevis arm openings 44 and 46, respectively. The example clevis pin assembly 36 comprises a clevis pin 50 and a split pin 52. The example clevis pin defines a clevis pin head 60, a clevis pin shaft 62, and a clevis pin opening 64. The example split pin 52 is an elongate member, typically metal, that is bent to define a split pin loop portion 70, a split pin first end portion 72, and a split pin second end portion 74. The example brake slack adjuster 24 defines a slack adjuster arm 80 and a slack adjuster shaft 82. A slack adjuster arm opening 84 is formed in the slack adjuster arm.

The clevis pin 50 is arranged to extend through the first clevis arm opening 44, the slack adjuster arm opening 84, and the second clevis arm opening 46 such that linear movement of the push rod 32 supporting the clevis 34 is translated to pivoting movement of the slack adjuster arm 80 about an clevis pin axis defined by the clevis pin 50. The clevis pin head 60 prevents the clevis pin 50 from passing in a first direction through the first clevis arm opening 44, the slack adjuster arm opening 84, and the second clevis arm opening 46. The split pin 52 is arranged to extend through the clevis pin opening 64 to prevent the clevis pin 50 from passing in a second direction (opposite the first direction) through the first clevis arm opening 44, the slack adjuster arm opening 84, and the second clevis arm opening 46.

The first example press tool 20*a* may be configured to displace a first part relative to a second part in a variety of environments. The present invention is particular significance when the first part is a clevis pin such as the clevis pin 50 and the second part is a brake slack adjuster such as the brake slack adjuster 24, and that application of the present invention will be described herein in detail. However, the present invention may be used in situations other than removal of a clevis pin from a brake slack adjuster as shown and described herein.

The first example press tool 20*a* is configured to remove the clevis pin 50 from the first clevis arm opening 44, the slack adjuster arm opening 84, and the second clevis arm opening 46. The first example press tool 20*a* comprises a base assembly 120, a drive pin 122, a guide sleeve 124, and a sleeve bias spring 126.

The example base assembly 120 comprises a base member 130 and a base cap 132. The base member 130 defines a housing portion 140, a brace portion 142, and a spacing portion 144. The spacing portion 144 rigidly connects the housing portion 140 and the brace portion 142 such that a gap G exists between the housing 140 and brace portion 142. The housing portion 140 140 defines a housing cavity 146, and the brace portion defines a brace cavity 148. A system axis S extends through the base member 130 through the housing cavity 146, across the gap G, and through the brace cavity 148. The example housing cavity 146 is a through hole defining a housing cavity first end opening 150 and a housing cavity second end opening 152. The housing portion 140 of the base member 130 defines interior housing portion 154 formed in the housing cavity 146 adjacent to the housing cavity first end opening 150. The housing portion 140 of the base member 130 further defines and interior housing restricted portion 156 formed in the housing cavity 146 adjacent to the housing cavity second end opening 152. The interior housing restricted portion 156 further defines a housing guide surface 158.

The example base cap 132 defines an outer threaded surface 160, an end flange 162, and an inner threaded surface 164. The outer threaded surface 160 is configured to engage the threaded portion 154 of the base member 130. The base cap 132 is secured to the base member 130 by threading the outer threaded surface 160 of the base cap 132 into the threaded portion 145 until the flange portion 162 comes into contact with the housing portion 140 of the base member 130.

The example drive pin 122 defines a first end 170 and a second end 172 and comprises a stop flange 174. The example drive pin 122 further defines a threaded shaft portion 176 and a press portion 178. The threaded shaft portion 176 is configured to engage the inner threaded surface 164 of the base cap 132.

The example guide sleeve 124 defines a first end flange 180, a second end flange 182, and a sleeve passageway 184 extending between the first and second end flanges 180 and 182. The example sleeve passageway 184 defines a sleeve passageway first end opening 190 and a sleeve passageway second end opening 192. The first end flange 180 extends radially outwardly from the guide sleeve 124 adjacent to the sleeve passageway first end opening 190, and the second end flange 182 extends radially inwardly from the guide sleeve 124 adjacent to the sleeve passageway second end opening 192. The example second end flange 182 of the guide sleeve 124 further defines a sleeve guide surface 194.

The example sleeve bias spring 126 is arranged within the housing cavity 146 between the base cap 132 and the guide sleeve 124 to apply a biasing force on the guide sleeve 124 away from the base cap 132. In particular, the example bias spring 126 engages an annular end surface 180*a* defined by the first end flange 180.

As shown in the drawing, the outer threaded surface 160 of the base cap 132 engages the threaded portion 154 of the housing cavity 146. The drive pin 122 engages the inner threaded surface 164 of the base cap 132 such that the drive axis D defined by drive pin 122 is substantially aligned with the system axis S. With the base cap 132 supported by the base member 132 and the drive pin 122 supported by the base cap 132, axial rotation of the drive pin 122 results in linear displacement of the drive pin 122 along the system axis S.

As also shown, the example base assembly 120 supports guide sleeve 124 for movement along the system axis S such that the example housing cavity 146, brace cavity 148, sleeve passageway 184 are all substantially aligned with the system axis S. The drawing figures illustrate that a diameter of the guide sleeve 124 between the first and second end flanges 180 and 182 is substantially the same as, but slightly smaller than, a diameter of the restricted portion 156. The drawing figures further illustrate that a diameter of the example press portion 178 is smaller than a diameter of the example threaded shaft portion 176 and substantially the same as, but slightly smaller than, a diameter of the sleeve passageway second end opening 192. The housing guide surface 158 thus acts on the guide sleeve 124 to maintain linear movement of the guide sleeve 124 along the system axis S, while the sleeve guide surface 194 acts on the press portion 178 of the drive pin 122 to maintain linear movement of the drive pin 122 along the system axis S. A diameter of the first end flange 180 of the guide sleeve 124 is larger than a diameter of the housing cavity second end opening 152 to limit movement of the guide sleeve 124 relative to the base assembly 120.

Figure 4:
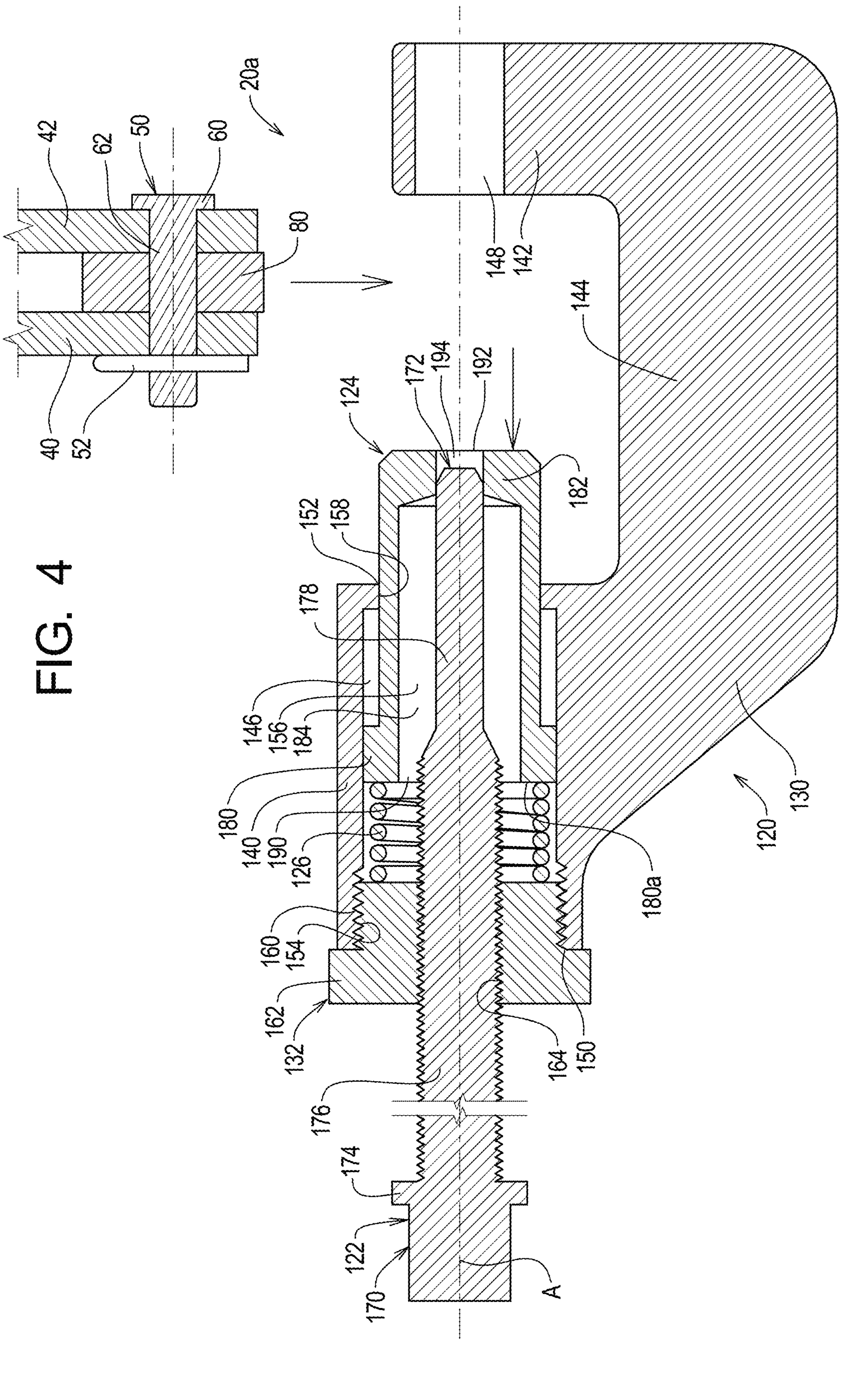
FIG. 4 is a longitudinal side section view depicting the first example press tool prior to engagement of the first example press tool with the clevis and clevis pin.
Figure 5:
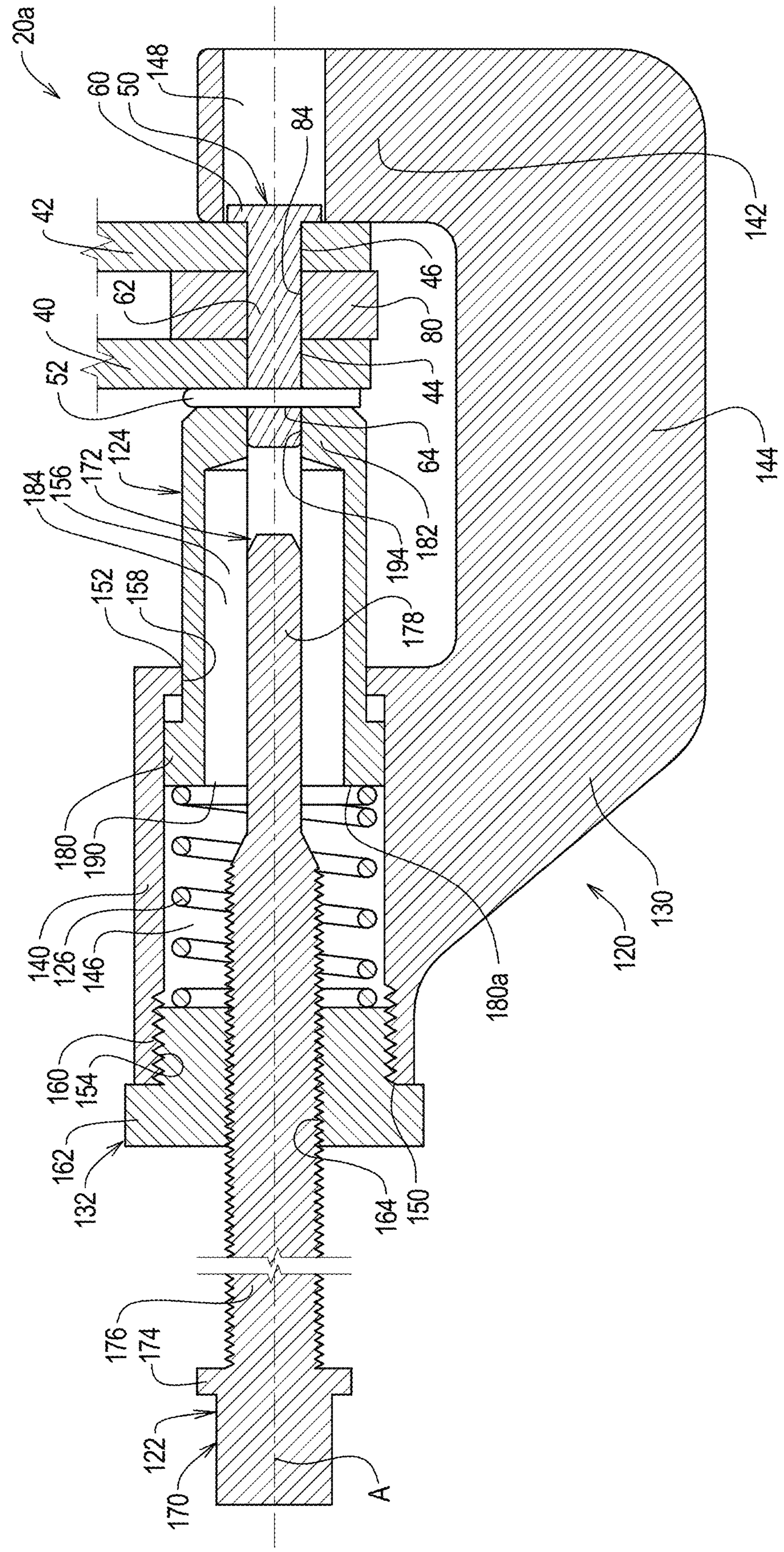
FIG. 5 is a longitudinal side section view depicting the first example press tool during pre-press engagement of the first example press tool with the clevis and clevis pin assembly.
Figure 6:
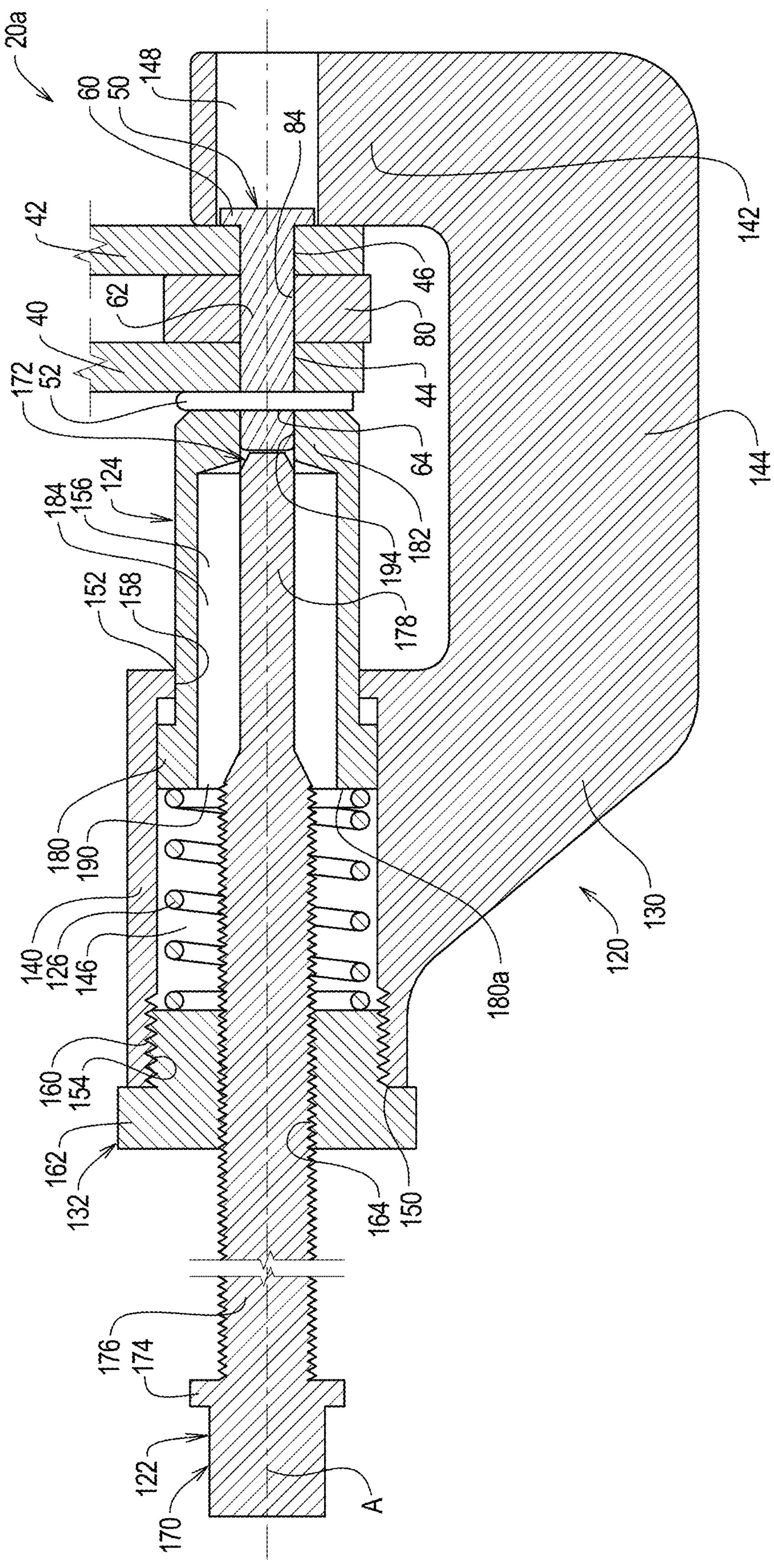
FIG. 6 is a longitudinal side section view depicting the first example press tool during initiation of driving of the clevis pin using first example press tool.
Figure 7:
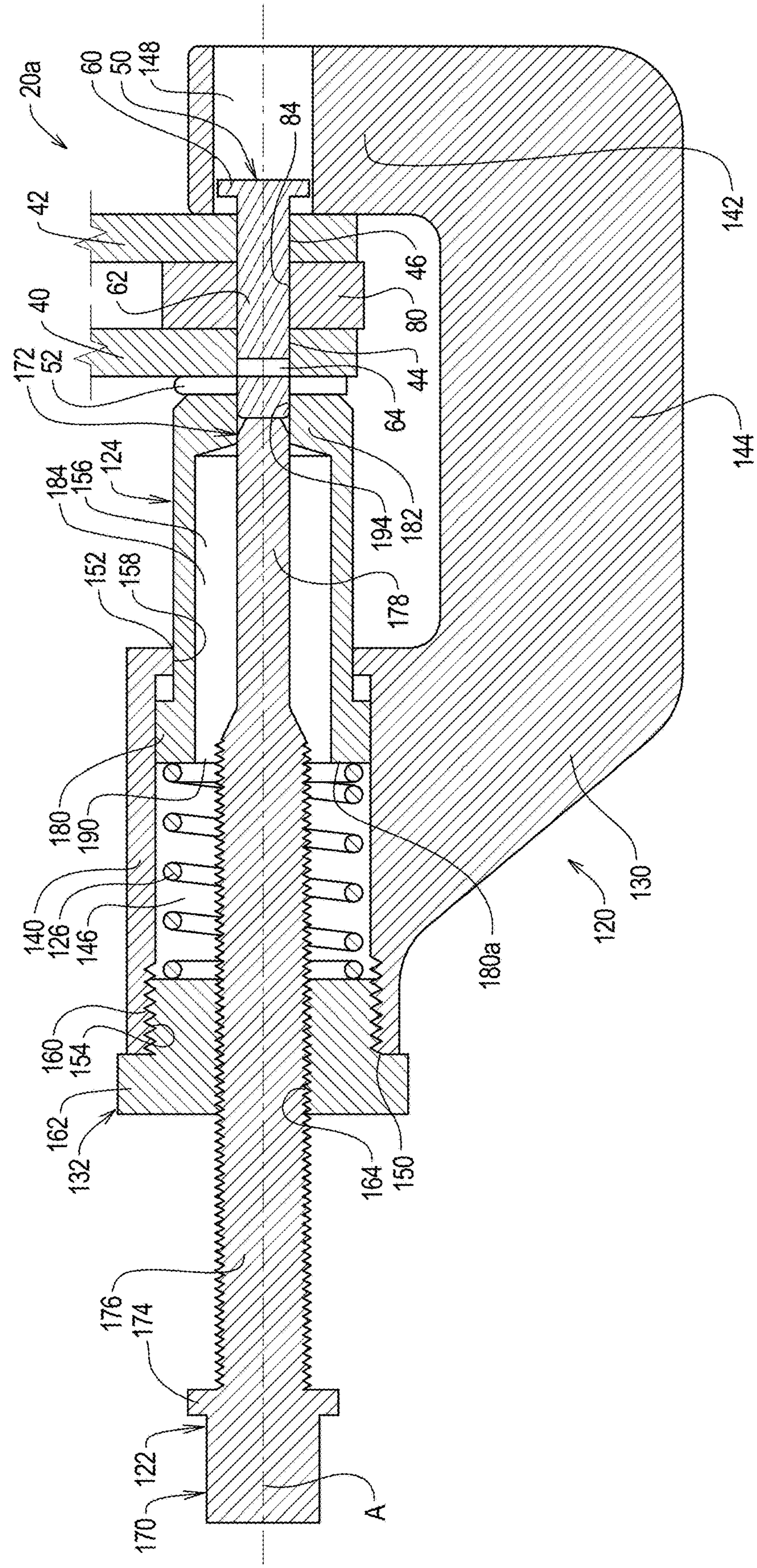
FIG. 7 is a longitudinal side section view depicting the first example press tool during driving of the clevis pin using first example press tool.
Figure 8:
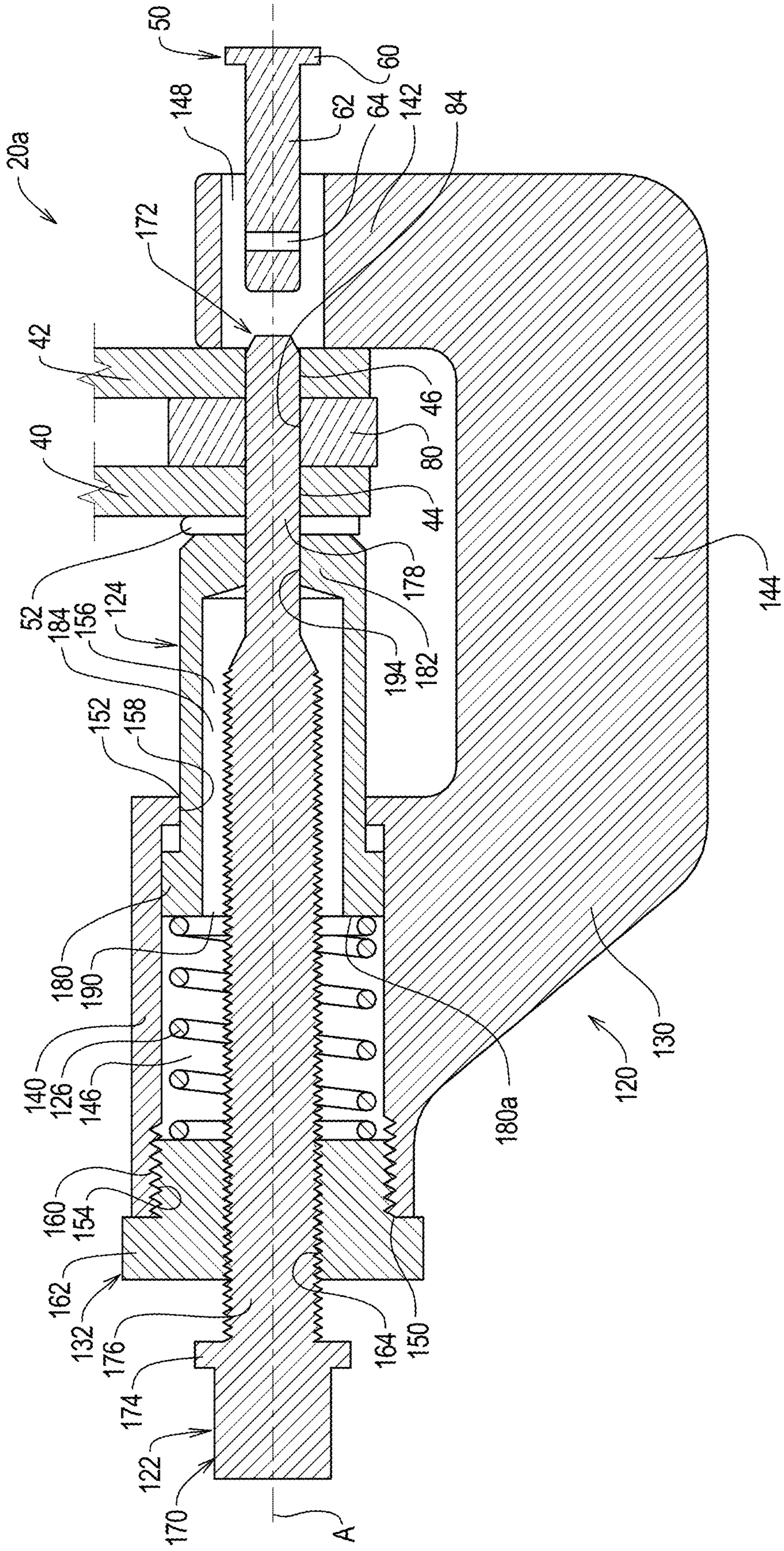
FIG. 8 is a longitudinal side section view depicting the first example press tool after driving of the clevis pin using first example press tool.
Figure 9:
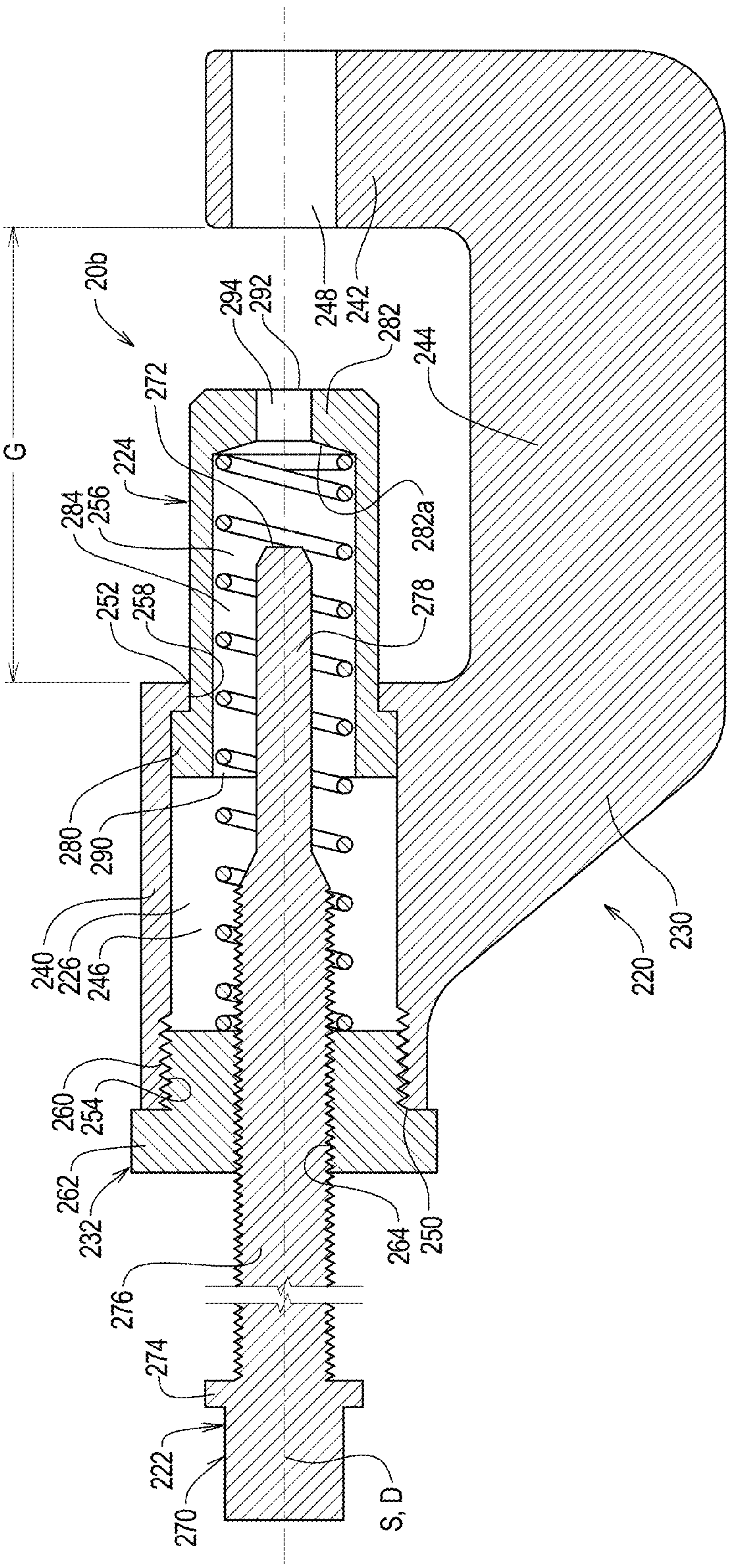
FIG. 9 is a longitudinal side section view of a second example press tool in a fully extended configuration.
Figure 10:
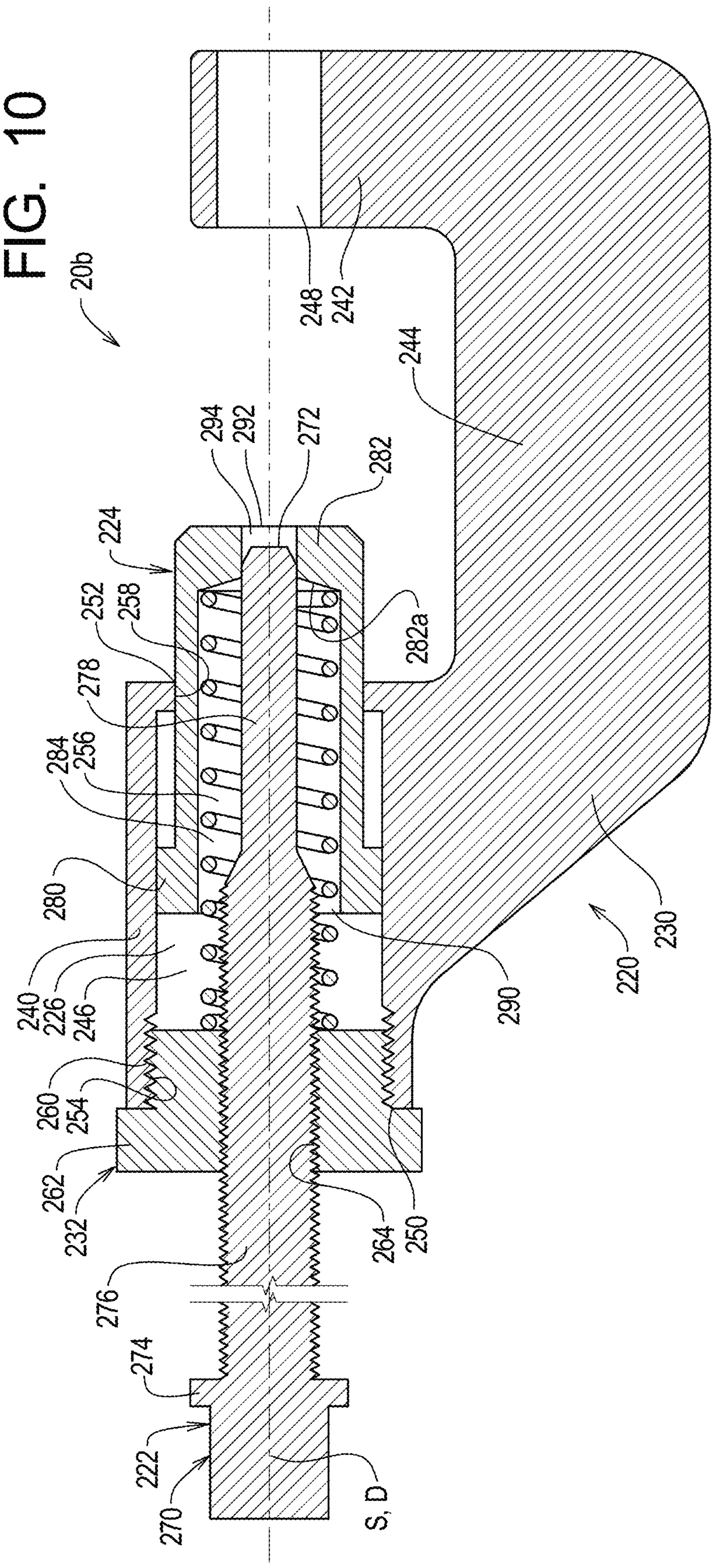
FIG. 10 is a longitudinal side section view depicting the second example press tool prior to engagement of the second example press tool with the clevis and clevis pin.

In use, while manually retracting the guide sleeve 124 within the housing cavity 146 against the force of the sleeve bias spring 126, at least a portion of the clevis 34 is arranged within the gap G such that an axis of the clevis pin 50 is substantially aligned with the drive axis D as shown in FIGS. 4 and 5. The guide sleeve 124 is then released such that the guide sleeve 124 engages the split pin 52 as shown in FIG. 5. The drive pin 122 is then axially rotated until the press portion 178 thereof engages the clevis pin 50 as shown in FIG. 6. Further axial rotation of the press pin 122 shears the clevis pin 50 and begins forcing the clevis pin 50 out of the clevis arm opening 46 as shown in FIG. 7. Continued axial rotation of the press pin 122 forces the clevis pin 50 completely out of the arm opening 46 as shown in FIG. 8.

The guide surfaces 158 and 194 substantially maintain linear movement of the guide sleeve 124 and the drive pin 122 during removal of the clevis pin 50.

II. Second Example Embodiment

Referring now to the drawing, depicted therein is a second example press tool 20*b* constructed in accordance with, and embodying, the principles of the present invention. The example press tool 20*b* is configured for use with a braking system 22 having a brake slack adjuster 24. The braking system 22 and brake slack adjuster 24 are or may be conventional and will be described herein only to that extent helpful to a complete understanding of the construction and operation of the second example press tool 20*b*.

The example braking system 22 comprises an air pot 30, push rod 32, clevis (or yoke) 34, and a clevis pin assembly 36. The example clevis 34 defines a first clevis arm 40 and a second clevis arm 42. The first and second clevis arms 40 and 42 define first and second clevis arm openings 44 and 46, respectively. The example clevis pin assembly 36 comprises a clevis pin 50 and a split pin 52. The example clevis pin defines a clevis pin head 60, a clevis pin shaft 62, and a clevis pin opening 64. The example split pin 52 is an elongate member, typically metal, that is bent to define a split pin loop portion 70, a split pin first end portion 72, and a split pin second end portion 74. The example brake slack adjuster 24 defines a slack adjuster arm 80 and a slack adjuster shaft 82. A slack adjuster arm opening 84 is formed in the slack adjuster arm.

The clevis pin 50 is arranged to extend through the first clevis arm opening 44, the slack adjuster arm opening 84, and the second clevis arm opening 46 such that linear movement of the push rod 32 supporting the clevis 34 is translated to pivoting movement of the slack adjuster arm 80 about a clevis pin axis defined by the clevis pin 50. The clevis pin head 60 prevents the clevis pin 50 from passing in a first direction through the first clevis arm opening 44, the slack adjuster arm opening 84, and the second clevis arm opening 46. The split pin 52 is arranged to extend through the clevis pin opening 64 to prevent the clevis pin 50 from passing in a second direction (opposite the first direction) through the first clevis arm opening 44, the slack adjuster arm opening 84, and the second clevis arm opening 46.

The second example press tool 20*b* may be configured to displace a first part relative to a second part in a variety of environments. The present invention is of particular significance when the first part is a clevis pin such as the clevis pin 50 and the second part is a brake slack adjuster such as the brake slack adjuster 24. The second example press tool 20*b* may thus be used in the same manner as the first example press tool 20*a*, the description of use of the second example press tool 20*b* will not be repeated herein. And like the first example press tool 20*a*, the present invention may be used in situations other than removal of a clevis pin from a brake slack adjuster as shown and described above.

The example press tool 20*b* comprises a base assembly 220, a drive pin 222, a guide sleeve 224, and a sleeve bias spring 226.

The example base assembly comprises a base member 230 and a base cap 232. The base member 230 defines a housing portion 240, a brace portion 242, and a spacing portion 244. The spacing portion 244 rigidly connects the housing portion 240 and the brace portion 242 such that a gap G exists between the housing 240 and brace portion 242. The housing portion 240 defines a housing cavity 246, and the brace portion defines a brace cavity 248. A system axis S extends through the base member 230 through the housing cavity 246, across the gap G, and through the brace cavity 248. The example housing cavity 246 is a through hole defining a housing cavity first end opening 250 and a housing cavity second end opening 252. The housing portion 240 of the base member 230 defines interior housing portion 254 formed in the housing cavity 246 adjacent to the housing cavity first end opening 250. The housing portion 240 of the base member 230 further defines and interior housing restricted portion 256 formed in the housing cavity 246 adjacent to the housing cavity second end opening 252. The interior housing restricted portion 256 further defines a housing guide surface 258.

The example base cap 232 defines an outer threaded surface 260, an end flange 262, and an inner threaded surface 264. The outer threaded surface 260 is configured to engage the threaded portion 254 of the base member 230. The base cap 232 is secured to the base member 230 by threading the outer threaded surface 260 of the base cap 232 into the threaded portion 254 until the flange portion 262 comes into contact with the housing portion 240 of the base member 230.

The example drive pin 222 defines a first end 270 and a second end 272 and comprises a stop flange 274. The example drive pin 222 further defines a threaded shaft portion 276 and a press portion 278. The threaded shaft portion 276 is configured to engage the inner threaded surface 264 of the base cap 232.

The example guide sleeve 224 defines a first end flange 280, a second end flange 282, and a sleeve passageway 284 extending between the first and second end flanges 280 and 282. The example sleeve passageway 284 defines a sleeve passageway first end opening 290 and a sleeve passageway second end opening 292. The first end flange 280 extends radially outwardly from the guide sleeve 224 adjacent to the sleeve passageway first end opening 290, and the second end flange 282 extends radially inwardly from the guide sleeve 224 adjacent to the sleeve passageway second end opening 292. The example second end flange 282 of the guide sleeve 224 further defines a sleeve guide surface 294.

The example sleeve bias spring 226 is arranged within the housing cavity 246 between the base cap 232 and the guide sleeve 224 to apply a biasing force on the guide sleeve 224 away from the base cap 232. In particular, the example bias spring 226 engages an inner surface 282*a* defined by the second end flange 282.

As shown in the drawing, the outer threaded surface 260 of the base cap 232 engages the threaded portion 254 of the housing cavity 246. The drive pin 222 engages the inner threaded surface 264 of the base cap 232 such that the drive axis D defined by drive pin 222 is substantially aligned with the system axis S. With the base cap 232 supported by the base member 230 and the drive pin 222 supported by the base cap 232, axial rotation of the drive pin 222 results in linear displacement of the drive pin 222 along the system axis S.

As also shown, the example base assembly 220 supports guide sleeve 224 for movement along the system axis S such that the example housing cavity 246, brace cavity 248, sleeve passageway 284 are all substantially aligned with the system axis S. The drawing figures illustrate that a diameter of the guide sleeve 224 between the first and second end flanges 280 and 282 is substantially the same as, but slightly smaller than, a diameter of the restricted portion 256. The drawing figures further illustrate that a diameter of the example press portion 278 is smaller than a diameter of the example threaded shaft portion 276 and substantially the same as, but slightly smaller than, a diameter of the sleeve passageway second end opening 292. The housing guide surface 258 thus acts on the guide sleeve 224 to maintain linear movement of the guide sleeve 224 along the system axis S, while the sleeve guide surface 294 acts on the press portion 278 of the drive pin 222 to maintain linear movement of the drive pin 222 along the system axis S. A diameter of the first end flange 280 of the guide sleeve 224 is larger than a diameter of the housing cavity second end opening 252 to limit movement of the guide sleeve 224 relative to the base assembly 220.

In use, while manually retracting the guide sleeve 224 within the housing cavity 246 against the force of the sleeve bias spring 226, at least a portion of the clevis 34 may be arranged within the gap G such that an axis of the clevis pin 50 is substantially aligned with the drive axis D. The guide sleeve 224 is then released such that the guide sleeve 224 engages the split pin 52. The drive pin 222 is then axially rotated until the press portion 278 thereof engages the clevis pin 50. Further axial rotation of the press pin 222 shears the clevis pin 50 and begins forcing the clevis pin 50 out of the clevis arm opening 46. Continued axial rotation of the press pin 222 forces the clevis pin 50 completely out of the arm opening 46.

The guide surfaces 258 and 294 substantially maintain linear movement of the guide sleeve 224 and the drive pin 222 during removal of the clevis pin 50.

What is claimed is:

1. A press tool comprising:

a base assembly comprising a base member defining a housing guide surface, a system axis, and a housing cavity, and a base cap;

a drive pin;

a bias member; and a guide sleeve defining a sleeve guide surface; wherein the guide sleeve is supported by the base member such that at least a portion of the guide sleeve is within the housing cavity;

the bias member is arranged within the housing cavity to bias the guide sleeve relative to the base member;

the base cap is detachably attached to the base member to maintain at least a portion of the guide sleeve and the bias member within the housing cavity;

the base assembly supports the drive pin for movement along the system axis;

the housing guide surface engages the guide sleeve; and the sleeve guide surface engages the drive pin.

2. A method of pressing a clevis pin comprising the following steps:

providing a base member defining a housing guide surface, a system axis, and a housing cavity;

providing a base cap;

providing a drive pin;

providing a bias member; and providing a guide sleeve defining a sleeve guide surface;

supporting the guide sleeve with the base member such that at least a portion of the guide sleeve is within the housing cavity;

arranging the bias member within the housing cavity to bias the guide sleeve relative to the base member;

detachably attaching the base cap to the base member to maintain at least a portion of the guide sleeve and the bias member within the housing cavity;

supporting the drive pin for movement along the system axis;

arranging the guide sleeve relative to the base member such that the housing guide surface engages the guide sleeve; and arranging the guide sleeve relative to the base member such that the sleeve guide surface engages the drive pin.

3. The press tool as recited in claim 1, in which:

the guide sleeve further defines a sleeve passageway extending between first and second end openings; and the guide sleeve is arranged such that the first end opening is within the housing cavity and the second end opening is outside of the housing cavity.

4. The press tool as recited in claim 1, in which:

the guide sleeve further defines a sleeve passageway, at least one first end projection, and at least one second end projection; and the guide sleeve is arranged such that the at least one first end projection is within the housing cavity and the at least one second end projection is outside of the housing cavity.

5. The press tool as recited in claim 4, in which:

the at least one first end projection extends radially outward relative to the guide sleeve; and the at least one second end projection extends radially inward relative to the guide sleeve.

6. The press tool as recited in claim 4, in which the at least one second end projection defines the sleeve guide surface.

7. The press tool as recited in claim 5, in which the at least one second end projection defines the sleeve guide surface.

8. The press tool as recited in claim 1, in which:

the guide sleeve further defines a sleeve passageway, a first end projection defining a first end opening, and a second end projection defining a second end opening; and the guide sleeve is arranged such that the first end projection is within the housing cavity and the second end projection is outside of the housing cavity.

9. The press tool as recited in claim 8, in which the at least one second end projection defines the sleeve guide surface.

10. The press tool as recited in claim 1, in which:

the guide sleeve further defines a sleeve passageway and first and second end projections; and the bias member is arranged at least partly within the sleeve passageway to engage the second end projection.

11. The press tool as recited in claim 1, in which:

the guide sleeve further defines first and second end projections; and the bias member is arranged to engage the first end projection.

12. The press tool as recited in claim 1, in which:

the guide sleeve further defines a sleeve passageway and at least one end projection, where the at least one end projection defines the sleeve guide surface; and at least a portion of the drive pin is arranged at least partly within the sleeve passageway.

13. The press tool as recited in claim 1, in which the drive pin engages the base cap such that axial rotation of the drive pin displaces the drive pin along the system axis.

14. The press tool as recited in claim 5, in which:

the at least one first end projection is a first end flange that extends radially outward relative to the guide sleeve; and the at least one second end projection is a second end flange that extends radially inward relative to the guide sleeve.

15. A press tool comprising:

a base assembly comprising a base member defining a housing guide surface, a system axis, and a housing cavity, and a base cap;

a drive pin;

a bias member; and a guide sleeve a sleeve passageway extending between first and second end openings, a first end flange defining the first end opening, and a second end flange defining the second end opening and the sleeve guide surface; wherein the guide sleeve is supported by the base member such that the first end flange is within the housing cavity and the second end flange is outside of the housing cavity;

the bias member is arranged within the housing cavity to bias the guide sleeve relative to the base member;

the base cap is detachably attached to the housing cavity second end opening to maintain the first end flange and the bias member within the housing cavity;

the base cap supports the drive pin such that axial rotation of the drive pin displaces the drive pin along the system axis;

the housing guide surface engages the guide sleeve; and the sleeve guide surface engages the drive pin.

16. The press tool as recited in claim 15, in which the at least one first end flange extends radially outward relative to the guide sleeve and the at least one second end flange extends radially inward relative to the guide sleeve.

17. The press tool as recited in claim 15, in which the bias member is arranged at least partly within the sleeve passageway to engage the second end flange.

18. The press tool as recited in claim 15, in which the bias member is arranged to engage the first end flange.

19. The press tool as recited in claim 15, in which at least a portion of the drive pin is arranged at least partly within the sleeve passageway.

* * * * *